June 23, 1931. J. H. WESTLUND 1,811,484
SAFETY DEVICE FOR AUTOMOBILES
Filed July 11, 1927
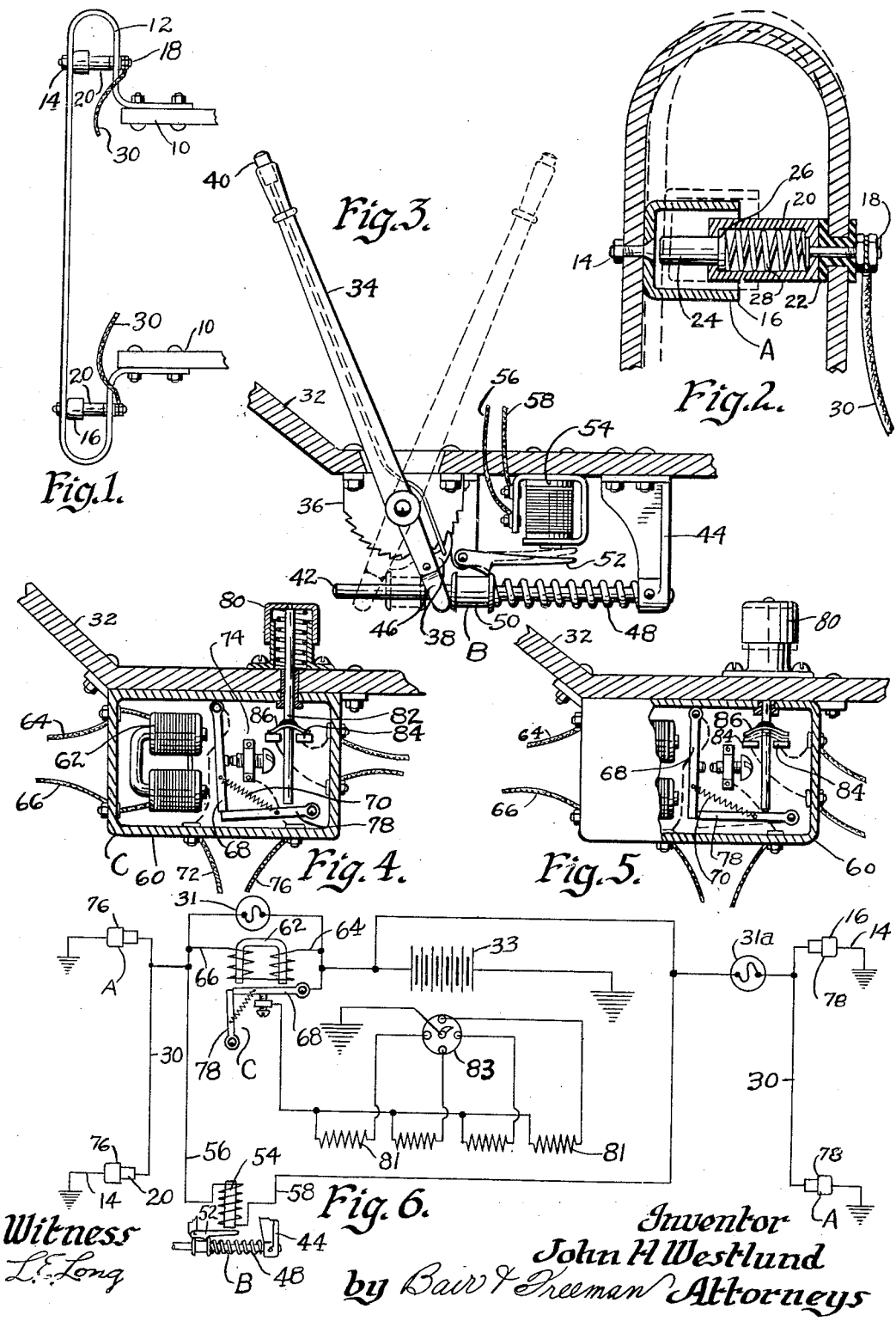

Patented June 23, 1931

1,811,484

UNITED STATES PATENT OFFICE

JOHN H. WESTLUND, OF MARSHALLTOWN, IOWA

SAFETY DEVICE FOR AUTOMOBILES

Application filed July 11, 1927. Serial No. 204,784.

The object of my invention is to provide a safety device for automobiles of simple, durable and comparatively inexpensive construction.

A further object of my invention is to provide a means on the extremities of a vehicle whereby contact of these means with an object will serve to warn the operator of the vehicle that the vehicle has come in contact with such object.

Still a further object is to provide the contact means for the purpose of operating a shut off mechanism associated with the motor of the vehicle whereby the motor is positively stopped when said contact means is operated.

Still a further object is to provide my safety device in connection with a vehicle having braking means on it, my device serving to release a brake actuating mechanism for stopping the motion of the vehicle when the contact means engages an object.

Still a further object is to provide the stopping means for the motor and the braking means for the vehicle so associated with the contact means on the extremities of the vehicle whereby both are operated upon engagement of the contact means with an object.

Still a further object is to arrange a locking mechanism for the shut off device so that when the contact members operate the shut off device, it will remain in position for stopping the motor and the starting switch button of the motor will have to be pressed to start the motor again. When the starter button is so pressed, it will reset the shut off mechanism so that it is ready for operation again when one of the contact members engage another object.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 illustrates a portion of the forwardly extending frame members of an automobile showing a bumper thereon and contact members mounted on the bumper.

Figure 2 is an enlarged sectional view of the contact members illustrating their relation to the bars of the bumper.

Figure 3 is a sectional view through the floor boards of an automobile showing the emergency brake lever and a portion of my safety device associated therewith.

Figure 4 is a sectional view through the floor boards of an automobile showing in section my motor shut off mechanism and its relation to the starting switch for the motor.

Figure 5 is a view similar to a portion of Figure 4, showing certain parts in another position; and Figure 6 is an electrical diagrammatic view of my device showing its relation electrically, to various elements comprising the automobile to which my device is attached.

On the accompanying drawings I have used the reference numeral 10 to indicate the ends of a frame of an automobile. The ends 10 may be at either the front or the rear as I mount portions of my device on each end of the automobile. Secured to the frame members 10 I have illustrated a spring bumper bar 12.

Secured by a bolt 14 to a portion of the bumper bar 12 is a metallic cup 16. This is best illustrated in Figure 2 of the drawings.

Secured to another portion of the bar 12 by a bolt 18 is a metallic sleeve 20. The bolt 18 and the sleeve 20 are suitably insulated from the bumper bar 12 by insulating material 22 which may be in any convenient form such as washers and a sleeve.

It will be noted that the cup 16 is considerably larger than the sleeve 20 and fits over it leaving a space between the two all around the sleeve 20. Slidably mounted in the sleeve 20 is a contact plunger 24 held against an inturned peripheral flange 26 of the sleeve 20. A spring 28 is utilized for holding the contact plunger 24 against the flange 26.

I have illustrated in Figure 1, two of the devices just described which I term "cup switches". Two cup switches would also be attached to the opposite end of the automobile in a similar manner, a second bumper bar 12 being provided for them. I shall hereinafter refer to the cup switches generally by the reference character A.

The cup switches A are adapted to establish an electrical current between a lead wire 30 and the frame work of the automobile usually termed the "ground". In this connection the cup 16 is grounded to the bumper bar 12 as clearly illustrated.

The lead wire 30 is connected to one side of a signal light 31 which may be mounted on the dash of an automobile or any position where it can be readily seen by the operator of the vehicle. The other side of the light 31 extends through a battery 33 which may be the storage battery of the automobile.

One side of the storage battery 33 is always grounded so that contact of the cup 16 with the sleeve 20 will cause an electrical circuit through the light 31 for notifying the operator of the vehicle that such contact has occured. It is to be understood that signals other than a light 31 can be used such as a bell or buzzer and also other devices can be operated by the circuit through the cup switch. These other devices I will now describe in detail.

The cup switches A are adapted to establish such a circuit whenever the bumper bar 12 is struck which moves the cup 16 into contact with the plunger 24. Excessive movement of the bumper bar 12 is compensated for by the spring 28. By making the contact member 16 cup shaped, it will contact with the sleeve 12 whenever it is moved sidewise as illustrated by the dotted line position in Figure 2. This insures establishment of the circuit regardless of what angle the bumper bar 12 is struck.

It is to be understood that the switches A can be arranged independently of a bumper bar and a plurality of them can be positioned around the sides and ends of a vehicle and supported by individual supports from the frame work of the vehicle itself.

I have merely illustrated the bumper bar 12 as one means of mounting the switches but I do not wish to be limited by this construction as the switches can be made to operate without the aid of a bumper bar and in either case will serve the same purpose.

Referring to Figure 3, the floor boards of the automobile are indicated at 32. All automobiles are provided with emergency brakes which are controlled by a brake lever 34. The brakes themselves are not illustrated. The brake lever 34 is pivoted to a notched sector 36 and is provided with a pawl 38, the movement of which can be controlled by a press button 40. The construction of the emergency brake lever just described is standard on most automobiles and is merely described here to show its relation to my safety device.

One portion of my safety device comprises a brake releasing mechanism B which includes a rod 42 supported by a bracket 44 beneath the floor boards 32. The rod 42 extends between a fork extension 46 which may be formed on the brake lever 44 or attached thereto. A coil spring 48 is positioned on the rod 42 and is held in compressed position by a spool 50. The spool 50 is slidably mounted on the rod 42 and is held in the position illustrated by a latch 52. The latch 52 is adapted to be raised from engagement with the spool 50 by an electro-magnet 54. The lead wires of the magnet 54 are indicated at 56 and 58.

It will be obvious that upward movement of the latch 52 caused by energization of the electro-magnet 54, will release the spool 50 and the spring 48, allowing the spring 48 to expand for causing the spool 50 to engage and move the fork 46 whereby the brake lever 34 is moved to position where the emergency brakes are set.

When the magnet 54 is de-energized, the latch 52 will drop into position to engage the spool 50. When the operator of the vehicle releases the emergency brakes by pushing the brake lever 34 forwardly, the spool 50 will be slid rearwardly on the rod 42 and the spool will be again engaged by the latch 52 and held in position with the spring 48 compressed.

The electrical connection between the cup switch A and the brake releasing mechanism B will be hereinafter more fully described.

In Figures 4 and 5 of the drawings, I have illustrated a device C for cutting off the ignition of the motor of the vehicle at certain times. The cut-off device C comprises a casing 60 secured to the underside of the floor boards 32. The casing 60 has mounted therein an electro-magnet 62 having lead wires 64 and 66 connected with it.

The electro-magnet 62 is adapted upon being energized to swing an armature 68 against the action of a spring 70. The armature 68 is connected with a lead wire 72 and is adapted to coact with a contact post 74. The contact post 74 is connected to a remaining wire 76.

A lock bar 78 is pivoted within the casing 60 and normally rests against the lower end of the armature 68 and is held in this position by the spring 70. When the electromagnet 62 is energized for pulling the armature 68, the lock bar 78 will be moved upwardly behind it as illustrated in Figure 5 for the purpose of preventing the spring 70 from pulling the armature back to normal position.

In the position illustrated in Figure 5, the contact between the armature 68 and the post 74 is broken. It will be obvious that the parts of the shut off device C thus far described, will remain in the position illustrated in Figure 5 until the lock bar 78 is moved downwardly.

The shut off device C is arranged in conjunction with a starter switch button 80. The button 80 is held upwardly by spring pressure and is attached to a rod 82. The rod 82 extends into the casing 60 and its lower end is adapted to engage the lock bar 78 when the button is pressed downwardly.

The contacts of the starter switch are illustrated at 84 and are electrically bridged by a contact bar 86 when the starter button 80 is depressed.

The lead wires 72 and 76 are cut into the ignition circuit of the motor of the vehicle so that the ignition system is shut off when the electro-magnets 62 are energized and remains shut off until the starter button 80 depresses the lock bar 78 for allowing the armature 68 to make contact with the post 74.

I will now describe the electrical connection between the brake releasing unit B, the shut off unit C and the switch units A. In Figure 6 I have illustrated these connections diagrammatically.

The cup switches 76 are the ones mounted on the front bumper 12 and the cup switches 78 are those mounted on the rear bumper bar. The cup switches 76 are included in the circuit of the signal light 31 and the cup switches 78 are included in the electrical circuit of a second signal light 31A. The lights 31 and 31A are mounted on the dash and serve to indicate to the operator of the vehicle when either of his bumper bars are depressed by coming in contact with an object such as another automobile when the operator is parking or moving away from a parking place.

The cup switches 76 are included in the electric circuit of the electro-magnets 62 and the armature 68 and contact post 74 are included in the ignition circuit of the automobile. This ignition circuit however, is illustrated as one example, by the primary coils 81 of the ignition spark coils.

A timer 83 serves to time the current supplying the spark plugs of the ignition system, the secondary coils of which are not illustrated. It will be understood, of course, that the contacts 68 and 74 may be included in any type of ignition circuit and I do not wish to be limited to the type shown.

Besides being included in the circuit of the light 31 and shut off mechanism C, the cup switches 76 are included in the circuit of the electro-magnet 54 whereby the magnet 54 is energized whenever either of the cup switches 76 are moved to establish an electrical circuit through them.

*Practical operation*

In the operation of my device when the rear bumper is struck, the light 31A will be energized. When the front bumper is struck, the light 31 will be energized as well as the braking unit B and the motor shut off unit C.

By this arrangement, an automobile travelling along a highway and equipped with my safety device, will upon bumping into an automobile ahead of it, be caused to stop by cutting off the ignition of the motor and releasing the emergency brake.

When the operator again wishes to proceed, it is merely necessary for him to depress the starter button 80 for re-establishing the ignition circuit and starting the motor of the automobile. The emergency brakes may then be released by moving the lever 34 forwardly which automatically compresses the spring 48. The entire device is then set for again being actuated upon engagement of the front bumper with another object.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with a vehicle having a motor thereon, a device of the character disclosed comprising shut off means for stopping said motor, starting means for starting said motor and movable means mounted on the extremities of said vehicle, said movable means being associated with said shut off means and with said starting means whereby movement of the movable means will operate the shut off means and lock it in shut-off position and movement of the starting means to again start the motor will release the shut off means in readiness to be again operated by the movable means.

2. A safety device for motor propelled vehicles comprising movable means mounted on the extremities of the vehicle and adapted to be moved when coming in contact with an object, and a shut off switch for stopping said motor, said shut off switch being operated by said movable switch when moved, a lock for said shut off means to cause it to continue to operate after the movable means has been returned to normal position and means actuated by the starting mechanism of the motor for rendering the lock inoperative.

3. A safety device for motor propelled vehicles including a starter and a starter switch, said safety device comprising movable means mounted on the extremities of the vehicle and adapted to be moved when coming in contact with an object, and shut off means for stopping said motor, said shut off means being operated by said movable means when moved, a lock for said shut off means to cause it to continue to operate after the movable means has been returned to normal position and means for rendering the lock inoperative, said means being operated by the starter switch of the motor after having been stopped by said shut off means.

4. A safety device for motor propelled vehicles having braking mechanism and a starter switch thereon, said device comprising movable means mounted on the extremities of the vehicle and adapted to be moved when coming in contact with an object, means for operating said brake upon such movement of said movable means, and shut off means for stopping said motor, said shut off means being operated by said movable means when moved, a lock for said shut off means to cause it to continue to operate after the movable means has been returned to normal position and means for rendering the lock inoperative, said last means being operated by the starting switch of the motor after having been stopped by said shut off means.

5. The combination with a starting switch and an ignition circuit of a vehicle engine of means for opening said ignition circuit, said means being operated by the engagement of an end of the vehicle with an object and including locking means for mantaining the circuit open, said locking means being so associated with said starter switch as to be rendered inoperative thereby upon movement of the starter switch to starting position.

Des Moines, Iowa, June 30, 1927.

JOHN H. WESTLUND.